(12) United States Patent
Gates, II (10) Patent No.: US 7,044,318 B2
(45) Date of Patent: May 16, 2006

(54) ELECTRICAL BOX WITH RECESSED FACEPLATE

(76) Inventor: Clark H. Gates, II, P.O. Box 1029, Parowan, UT (US) 84761

( * ) Notice: Subject to any disclaimer, the term of this patent is extended or adjusted under 35 U.S.C. 154(b) by 388 days.

(21) Appl. No.: 10/008,738

(22) Filed: Nov. 9, 2001

(65) Prior Publication Data

US 2003/0089710 A1    May 15, 2003

(51) Int. Cl.
*H02G 3/08* (2006.01)
(52) U.S. Cl. .................................................. 220/3.94
(58) Field of Classification Search ................. 220/3.3, 220/3.92, 3.94, 4.02, 4.03, 4.26, 3.2, 3.5, 220/3.4, 3.6, 3.9, 3.7, 3.8; 174/57, 66, 67
See application file for complete search history.

(56) References Cited

U.S. PATENT DOCUMENTS

| | | | | |
|---|---|---|---|---|
| 3,098,114 A | * | 7/1963 | Hawn et al. ................. | 174/58 |
| 3,170,028 A | * | 2/1965 | Otten ........................ | 174/58 |
| 3,318,476 A | * | 5/1967 | Clark ........................ | 220/3.4 |
| 3,588,017 A | * | 6/1971 | O'Brien ..................... | 248/205.1 |
| 4,699,289 A | * | 10/1987 | You .......................... | 220/3.7 |
| 5,600,093 A | * | 2/1997 | Herth et al. ................ | 174/53 |
| 5,727,706 A | * | 3/1998 | Richter ...................... | 220/3.2 |
| 5,975,323 A | * | 11/1999 | Turan ........................ | 220/3.7 |
| 6,072,121 A | * | 6/2000 | Penczak et al. ............. | 174/48 |
| 6,395,984 B1 | * | 5/2002 | Gilleran ..................... | 174/58 |

* cited by examiner

*Primary Examiner*—Stephen Castellano
(74) *Attorney, Agent, or Firm*—Fehr Law Firm; Thompson E. Fehr (57) ABSTRACT

An electrical box with recessed faceplate having a one-piece recessed faceplate and adapted to accommodate a two-piece recessed faceplate. A rear portion contains channels on the top, bottom, and sides. A connecting wall attaches the rear portion to the front portion. The connecting wall extends beyond the rear portion and preferably contains one or more apertures to accommodate releasable fasteners such as screws. These apertures and the channels assure that no screws or analogous components of another type of releasable fastener are not exposed within the box. The two-piece recessed faceplate has an inner portion and an outer portion which slide along each other in order to enable the box to be mounted at different distances from the mounting surface. Optionally, a removable cover extends across the mouth of the faceplate. An extender is also available for converting traditional electrical boxes into a box that can accommodate a recessed faceplate. And an alternative electrical box holds switches and is L-shaped.

8 Claims, 7 Drawing Sheets

ELECTRICAL BOX WITH RECESSED FACEPLATE

BACKGROUND OF THE INVENTION

1. Field of the Invention

This invention relates to boxes for containing the wide variety of electrical equipment that is traditionally installed within electrical boxes, such as receptacles, modular telephone jacks, stationary connectors for coaxial cables, switches, and the like.

2. Description of the Related Art

Electrical equipment, such as receptacles, modular telephone jacks, stationary connectors for coaxial cables, switches, and the like is placed in the walls of almost all modern buildings. Into such devices, electrical connectors of various configurations can be removably inserted to provide a pathway for electricity to be supplied to such device to perform a variety of tasks, including powering an electrical appliance or carrying a signal for a telephone, computer, or television.

The standard faceplate for electrical instrumentalities, i.e., receptacles, modular telephone jacks, stationary connectors for coaxial cables, switches, and the like, is basically a planar device which fits closely against the exterior surface of the wall and is attached, directly or indirectly, to a standard electrical box. An electrical box is the metallic or plastic box which contains one or more electrical receptacles (usually two or four), modular telephone jacks, stationary connectors for coaxial cables, switches, or the like, i.e., electrical instrumentalities, that are permanently connected to the electrical wiring of the building.

Most electrical instrumentalities are connected with screws to the electrical box; the faceplate then is generally connected with screws or by snap-fitting to the electrical instrumentality and is thereby indirectly connected to the electrical box. Other electrical instrumentalities are attached to the faceplate, and the faceplate is directly connected with screws or by snap-fitting to the electrical box. In either case, one or more apertures, designated herein the instrumentality apertures, accommodate the portions of the electrical instrumentalities that are intended to be exposed.

Unlike a standard faceplate, a recessed faceplate, however, has only an edge which fits closely against the exterior surface of the wall; the portion of the recessed wall plate that is in the same plane as the exterior surfaces of the electrical outlets is some distance inward from the surface of the wall.

Recessed faceplates for receptacles, modular telephone jacks, stationary connectors for coaxial cables, and the like, i.e., electrical instrumentalities, provide the advantage that only the electrical cords, telephone lines, or cables of an electrical appliance (if the electrical connector that is physically associated with a particular electrical appliance is attached to a cord, line, or cable, rather than being directly connected to the appliance) will extend outward from the plane that forms the surface of a wall into which a receptacle, modular telephone jack, stationary connector for coaxial cables, or the like, i.e., an electrical instrumentality, has been mounted. And in the case of switches, nothing will extend beyond the plane of the wall.

Two sections of the National Electrical Code are especially important for an electrical box with a recessed faceplate.

Section 370-20 provides, "In walls or ceilings of concrete, tile, or other noncombustible material, boxes shall be installed so that the front edge of the box will not be set back of the finished surface more than ¼ in. (6.35 mm). In walls and ceilings constructed of wood or other combustible material, boxes shall be flush with the finished surface or project therefrom."

And section 410-56 (e) states, in pertinent part, "Faceplates shall be installed so as to completely cover the opening and seat against the mounting surface."

The present inventor is aware of a number of United States patents for electrical boxes with a recessed faceplate, viz., U.S. Pat. Nos. 4,059,327; 4,936,794; 4,988,832; 5,257,946; 5,387,761; and 5,574,256. None of these, however, have the ability to accommodate a recessed faceplate adapted to be extended so that, after installation of the box, the faceplate can be adjusted so that the faceplate meets the preceding requirements of the National Electrical Code; nor do they provide a mechanism for adapting a traditional electrical box to accommodate a recessed faceplate.

U.S. Pat. No. 4,059,327 just has a fixed bracket 20 and 24 against which a cover plate rigidly mounts in only one possible position. U.S. Pat. No. 4,936,794 simply has a recessed faceplate 26 rigidly attached to a tab 18 or 18a in only one possible position for a given embodiment of the box; and, in the embodiment using tab 18a, a slot 36 leaves an opening in the box, albeit on the outer side of the outlet. U.S. Pat. No. 4,988,832 employs a faceplate termed a bracket 12 rigidly attached to a stanchion 40, 42 in the box termed a housing 10 in only one possible position. U.S. Pat. No. 5,257,946 has a recessed cover plate 26 with a rear portion 48 that can be rigidly attached in only one possible position, with a screw, to the outlet, which is attached to the outlet box. U.S. Pat. No. 5,387,761 possesses a faceplate 36 that has a recess 42 that is only deep enough to accommodate a cover 54; the faceplate 36 can be rigidly attached to the electrical box 14 in only one possible position. And in the device of U.S. Pat. No. 5,574,256, the outlet 20 is attached to a recessed wall 16 that is an integral portion of the box 10; and the faceplate 30 mounts to the front of the box 10 in only one possible position.

Two of the preceding patents, viz., U.S. Pat. Nos. 4,988,832 and 5,387,761 include reclosable covers; U.S. Pat. No. 5,574,256 has a cover that is screwed in place; and U.S. Pat. No. 5,272,281 applies to an electrical outlet safety cover that is screwed in place. None of such covers, however, can be slid onto a faceplate.

Three patents, i.e., U.S. Pat. No. 3,530,230; U.S. Pat. No. 4,090,769; and U.S. Pat. No. 4,918,259 are, though known for modifying electrical boxes that have already been installed.

U.S. Pat. No. 3,530,230 discloses two embodiments. The first has an outer frame member 12 and a cover plate 14; the second, an outer frame 40 and a cover plate 46. In both embodiments, however, there is a gap between the walls 18, 42 and the electrical box 30, 64. The distance between the cover plate 14, 46 and the outer frame 12, 40 is only discretely (not continuously adjustable); the outer frame 12, 40 isn't fastened to anything; and, if the frame member 12 is flush against the wall, the cover plate 14 may not even touch the outlet because the distance between scoring of the tabs 20 may create a stop for the back of the cover plate 14 that is some distance in front of the outlet.

The device of U.S. Pat. No. 4,090,769 just plugs into an existing outlet, does not extend the electrical box, and has no indication that distance it extends from the existing electrical box is adjustable.

And U.S. Pat. No. 4,918,259 explicitly indicates that it does not extend the electrical box by stating, "The intent of the present invention is not to extend the receptacles, but rather to extend the cover . . . " Moreover, the distance between the face of the cover frame 36 and the outlet is only discretely (not continuously) adjustable; and the cover frame 36 does not screw into place.

Finally, no electrical box is known to the Inventor wherein switches are mounted so that, upon installation, the faces of the switches will be other than generally in the same plane as the wall of the building in which the electrical box is located.

SUMMARY OF THE INVENTION

The present invention includes both a new electrical box with a recessed faceplate and an electrical box with a recessed faceplate that is created by modifying a traditional electrical box.

Both have a one-piece faceplate; but the new electrical box is also designed to accommodate a two-part faceplate which permits adjusting the distance between the outward surface of the electrical instrumentality installed within the electrical box and the flange at the front of the faceplate so that, after installation of the box, it can be assured that the flange of the faceplate will be flush against the wall in which the electrical box has been installed and that a wall of the faceplate will be flush against the outward surface of the installed electrical equipment, thereby meeting, in a relatively easy fashion, the previously cited portions of the National Electrical Code.

Furthermore, no screws or other components of a releasable fastener not employing screws are exposed in any of the versions of the electrical box; and once the electrical instrumentality is installed within the box, there are no openings in the electrical box.

The preceding is basically accomplished by enlarging both the height and width of the mouth of the electrical box as well as adding threaded channels to the sides of the electrical box.

An extender is used with a traditional electrical box to create the ability to install electrical instrumentalities within the assembled electrical box in a recessed aspect while still insuring that the assembled box extends sufficiently close to the finished surface of the wall in which the electrical box has been installed to meet the relevant portions of the National Electrical Code.

Optionally, a sliding cover may be removably attached over either the one-piece or the two-piece recessed faceplate.

An additional embodiment is a new electrical box for one or more switches wherein the switches are to be oriented so that upon installation the faces of the switches will be other than parallel to the wall of building in which the electrical box is placed.

DESCRIPTION OF THE PREFERRED EMBODIMENT

Figure 1:
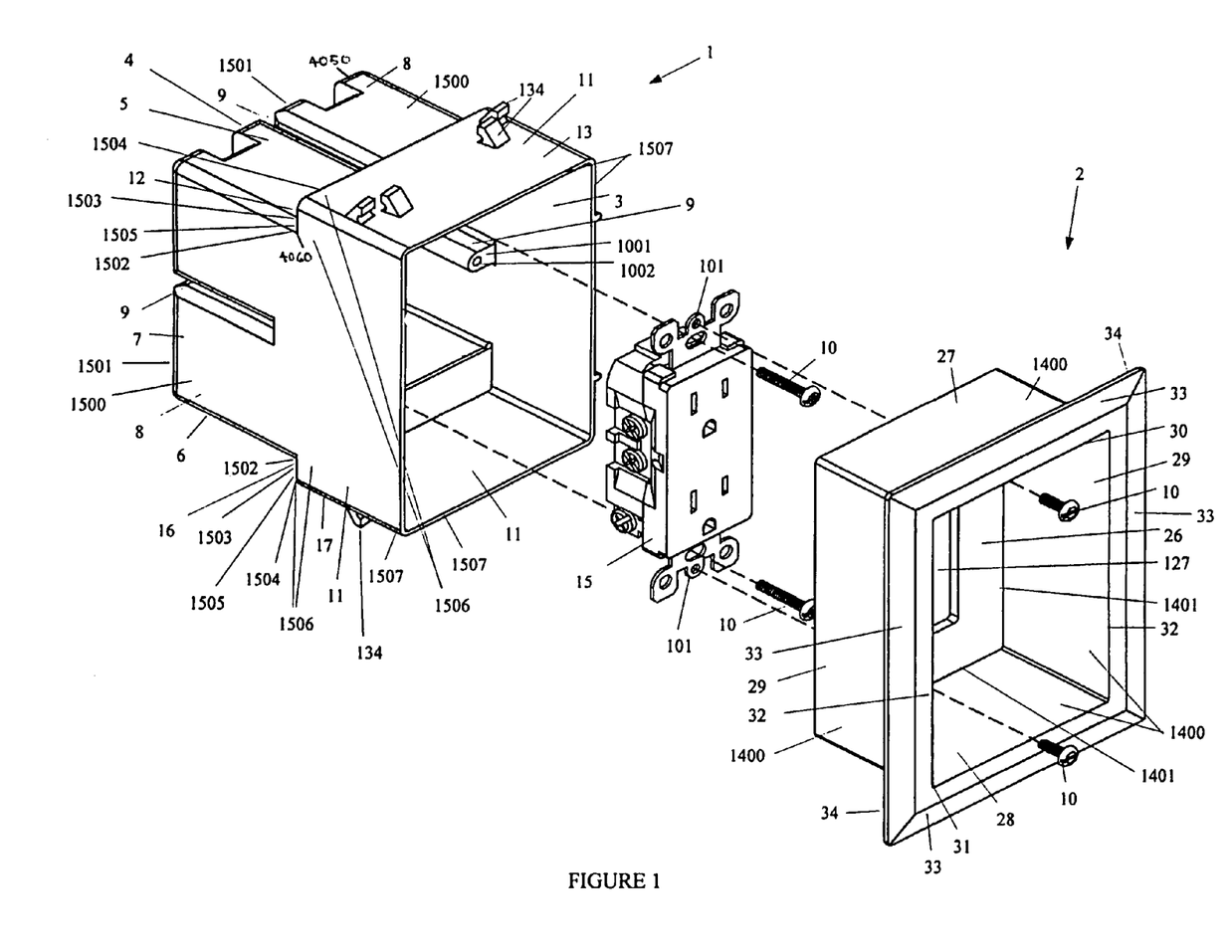
FIG. 1 illustrates an Electrical Box with Recessed Faceplate having a one-piece box recessed faceplate but designed to accommodate a two-piece recessed faceplate.

The Electrical Box with Recessed Faceplate having a one-piece recessed faceplate but designed to accommodate a two-piece recessed faceplate has, as illustrated in FIG. 1, a box 1 into which a one-piece recessed faceplate 2 is removably inserted.

The box 1 has an open front or mouth 3 and a closed back 4, although the rear wall 4 contains the knock-out tabs that are well known in the art for creating openings through which wiring can pass.

Attached to and projecting generally forward from the rear wall 4 is a lateral surface 1500 that connects the perimeter 1501 of the rear wall 4 to a first end 1502 of a connecting wall 1503 which connecting wall 1503 extends generally outward from, and preferably, perpendicular to, the lateral surface 1500. A first end 4050 of the lateral surface 1500 is connected to the perimeter 1501 of the rear wall 4, and a second end 4060 of the lateral surface 1500 is connected to the first end 1502 of the connecting wall 1503. Attached to and projecting generally forward from the second end 1504 and from the sides 1505 (At least when the box 1 has a rectangular shape, the portions of the second end 1504 of the connecting wall 1503 that is in the same plane as the sides 7 of the box 1 are termed "sides" 1505.) of the connecting wall 1503 is the first end 1506 of the front portion 11. The second end 1507 of the front portion 11 forms the mouth 3 of the box 1.

The top 5, bottom 6, and sides 7 of the rear portion 8 of the box 1 each contain a channel 9 extending into the box 1 to accommodate a releasable fastener, preferably a screw, 10, with each channel 9 extending toward the back 4 of the box 1 and preferably being generally centrally located across the top 5, bottom 6, and each side 7 of the box 1.

Figure 2:
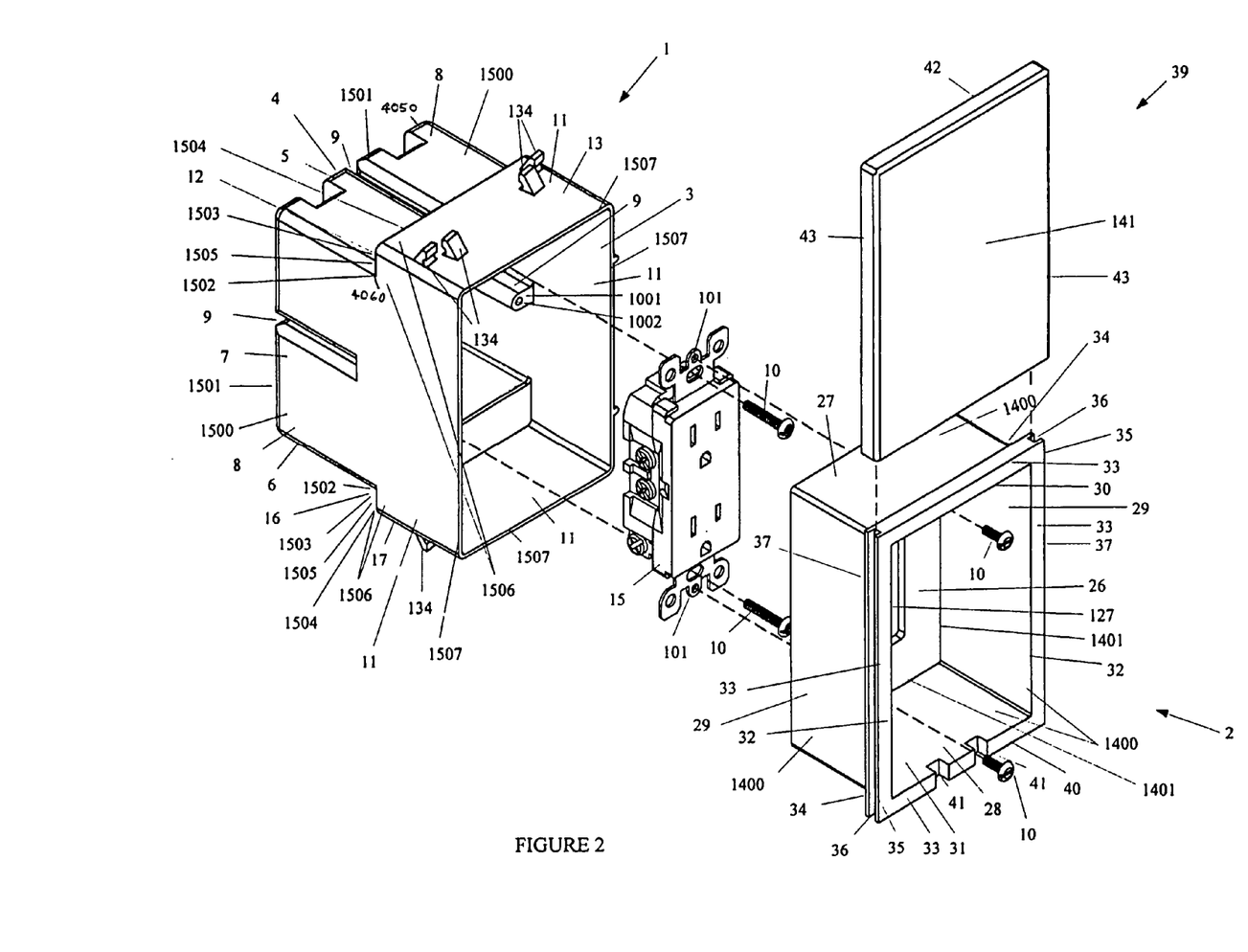
FIG. 2 is the same embodiment as that of FIG. 1 with the addition of a sliding cover.

In the preferred embodiment, the box 1 has a rectangular cross section. As illustrated in FIG. 1 and FIG. 2, the front portion 11 of the box 1 extends beyond the top 5 and beyond the bottom 6 of the rear portion 8. A top wall 12 that is preferably generally parallel to the front 3 and the back 4 of the box 1 runs from the top 5 of the rear portion 8 to the top 13 of the front portion 11 of the box 1 and between the sides 7 of the box 1. Similarly, a bottom wall 16 that is preferably generally parallel to the front 3 and the back 4 of the box 1 runs from the bottom 6 of the rear portion 8 to the bottom 17 of the front portion 11 of the box 1 and between the sides 7 of the box 1. Thus, in the preferred embodiment, the connecting wall 1503 is comprised of the top wall 12 and the bottom wall 16 and sides 7 which are integrally formed with the sides 7 of the rear portion 8 and the sides 7 of the front portion 11 of the box 1.

As suggested above, the interior ends 1001 of the channels 9 lie within the front portion 11 of the box 1; such ends 1001 are preferably covered except for a threaded aperture 1002 in such ends 1001 and are preferably all substantially aligned with one another.

The channels 9 and, in the preferred embodiment, the threaded apertures 1002 of the upper and lower channels 9 are used either to attach an electrical instrumentality 15 or a faceplate to the box 1. Whether the attachment is for an electrical instrumentality 15 or a faceplate is determined by whether the electrical instrumentality 15 is intended to be attached to the faceplate or directly to the box 1. This is the same situation as for traditional electrical boxes. If the electrical instrumentality 15 is intended to be attached directly to the box 1, the threaded apertures 1002 of the upper and lower channels 9 each accommodate a screw 10 for holding the electrical instrumentality 15 to the box 1, as illustrated in FIG. 1 through FIG. 4. Otherwise, the threaded apertures 1002 of the upper and lower channels 9 would be available to retain a screw 10 for holding the faceplate to the box 1.

Furthermore, as is the case with traditional faceplates, attachment of an electrical instrumentality 15 to a faceplate can be permanent or releasable, at least when the faceplate is intended to be attached directly to the box 1.

Retention of faceplates, whether one-piece or two-piece, to electrical boxes 1 is, as indicated above, preferably done with screws 10, as illustrated in FIG. 1 through FIG. 4, since screws tend to pull the faceplate against the mounting surface. However, the only essential feature is that a releasable fastener be used to hold the faceplate either directly to the box 1 or indirectly to the box 1 by having the faceplate directly attached, with a releasable fastener, to an electrical instrumentality 15 that is, itself, directly connected to the box 1 with a releasable fastener. Thus, for example, any type of snap-fit for a faceplate to the box 1 or to the electrical instrumentality 15 that is well known in the art may be employed.

For the embodiments depicted in FIG. 1 through FIG. 4, the top wall 12 contains an aperture 19 to accommodate a screw 10 that extends through the top wall 12 outside the box 1. Similarly, the bottom wall 16 contains an aperture 20 to accommodate a screw 10 that extends through the bottom wall 16 outside the box 1 for the same purpose as the aperture 19. Apertures 19, 20 accommodate screws 10 which are used to attach faceplates to the type of electrical instrumentality 15 depicted in FIG. 1 through FIG. 4, using threaded aperture 101 of the electrical instrumentality 15. For different electrical instrumentalities, however, the number and location of apertures for attaching a faceplate to an electrical instrumentality 15 depend upon particular electrical instrumentality 15 that is utilized.

Figure 3:
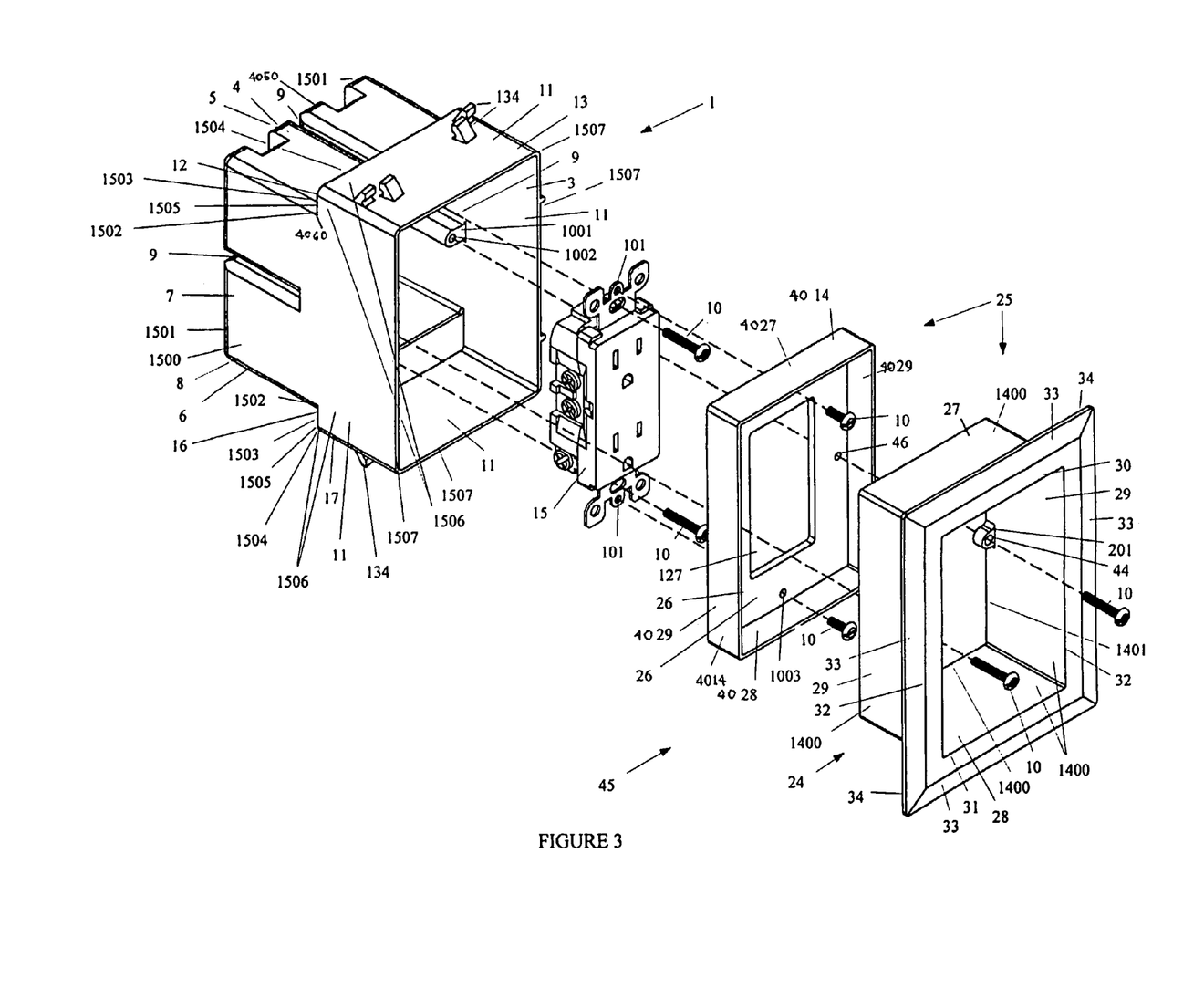
FIG. 3 depicts an Electrical Box with Recessed Faceplate having a two-piece recessed faceplate.

The channels 9 on the sides 7 of the box 1 and their associated threaded apertures 1002 accommodate screws 10 to draw toward the box 1 and retain the outer portion 24 of a two-piece recessed faceplate 25, as shown in FIG. 3.

The one-piece recessed faceplate 2 has a rear wall 26 containing one or more instrumentality apertures 27 to accommodate the electrical instrumentality 15. Attached to and projecting generally forward from the rear wall 26 is an interior surface 1400 that connects the perimeter 1401 of the rear wall 26 to a flange 33. The rear wall 26 has substantially the same shape as does the cross section of the front portion 11 of the box 1. In the case of a box 1 having a traditionally rectangular cross section, as depicted in FIG. 1 and FIG. 2, the interior surface 1400 comprises a top 27, bottom 28, and two sides 29 attached to one another so as to form a four-sided object. To the front 30 of the top 27, the front 31 of the bottom 28, and the front 32 of the two sides 29 is attached a flange 33, the back side 34 of which flange 33 is designed to seat against the mounting surface. The faceplate 2 has, in comparison to the box 1, dimensions such that the flange 33 extends from the interior surface 1400 of the box 1 to a position laterally beyond the front of the mouth 3.

The rear wall 26 is also adapted to accommodate a releasable fastener for fastening the faceplate 2 directly or indirectly, through the electrical instrumentality 15, to the box 1. Preferably, this consists of one or more apertures 1003 to accommodate screws 10.

Thus, the Electrical Box with Recessed Faceplate having a one-piece recessed faceplate has a box 1 adapted to accommodate a two-piece recessed faceplate 25, has no screws 10 or analogous components of another type of releasable fastener exposed within the box 1 behind the installed electrical equipment 15, and possesses no substantial gaps or apertures other than those designed to accommodate the installed electrical equipment 15 and screws 10 or components of another type of releasable fastener. The description to this point has concentrated upon the embodiments depicted in FIG. 1 through FIG. 4. Any embodiment utilizing the inventive features described in the first sentence of this paragraph would, however, fall within the scope of this invention, e.g., the cross section of the box 1 need not necessarily be rectangular.

Attached to the top 13 of the front portion 11 or to the top 5 of the rear portion 8 of the box 1, but preferably to the top 13 of the front portion 11 of the box 1, and also to the bottom 17 of the front portion 11 or to the bottom 6 of the rear portion 8 of the box 1, but preferably to the bottom 17 of the front portion 11 of the box 1, are projections 134 between which nails can be inserted to fasten the box 1 to a surface, preferably a stud.

As shown in FIG. 2, the sides 35 of the flange 33 optionally contain channels 36 running along the edge 37 of the flange 33 to accommodate longitudinal tabs 38 of a cover 39 so that the cover 39 can be removably placed over the Electrical Box with Recessed Faceplate. In the embodiment of FIG. 2, the lower portion 40 of the flange 33 contains one or more indentations 41 to accommodate the electrical cords, telephone lines, or cables of any electrical instrumentality that may be plugged into the receptacle 15.

The cover 39 preferably has a front surface 141, a top 42 connected to the front surface 41, and two sides 43 each of which is connected to the front surface 141 and to the top 42 to form a four-sided structure. The longitudinal tabs 38 extend inward from each side 43, and the top 42 functions as a stop to preclude the cover 39 from sliding below the flange 33.

The outer portion 24 of the two-piece recessed faceplate 25 is constructed just as is the one-piece recessed faceplate 2 except that such outer portion 24 does not have a rear wall 26 but instead has attached to each side 29 a longitudinal projection 201 extending inward having an aperture 44 to accommodate a screw 10 or other releasable fastener that will draw toward the box 1, and retain, the outer portion 24 of the two-piece recessed faceplate 25. This pulls the back side 34 of the flange 33 against the mounting surface.

The inner portion 45 of the two-piece recessed faceplate 25 is constructed the same as the one-piece recessed faceplate 2 except that it does not have the flange 33 but does possess the number of apertures 46, two apertures 46 in the case of screws 10, to accommodate the releasable fasteners that draw the outer portion 24 of the two-piece recessed faceplate 25 to the box 1.

The top 27, bottom 28, and two sides 29 for the outer portion 24 of the two-piece recessed faceplate 25 are sized so that they will slide along the inside of the top 4027, bottom 4028, and two sides 4029, respectively, of the interior surface 4014 of the inner portion 45 in order that there will substantially be no gaps between these corresponding features.

Figure 4:
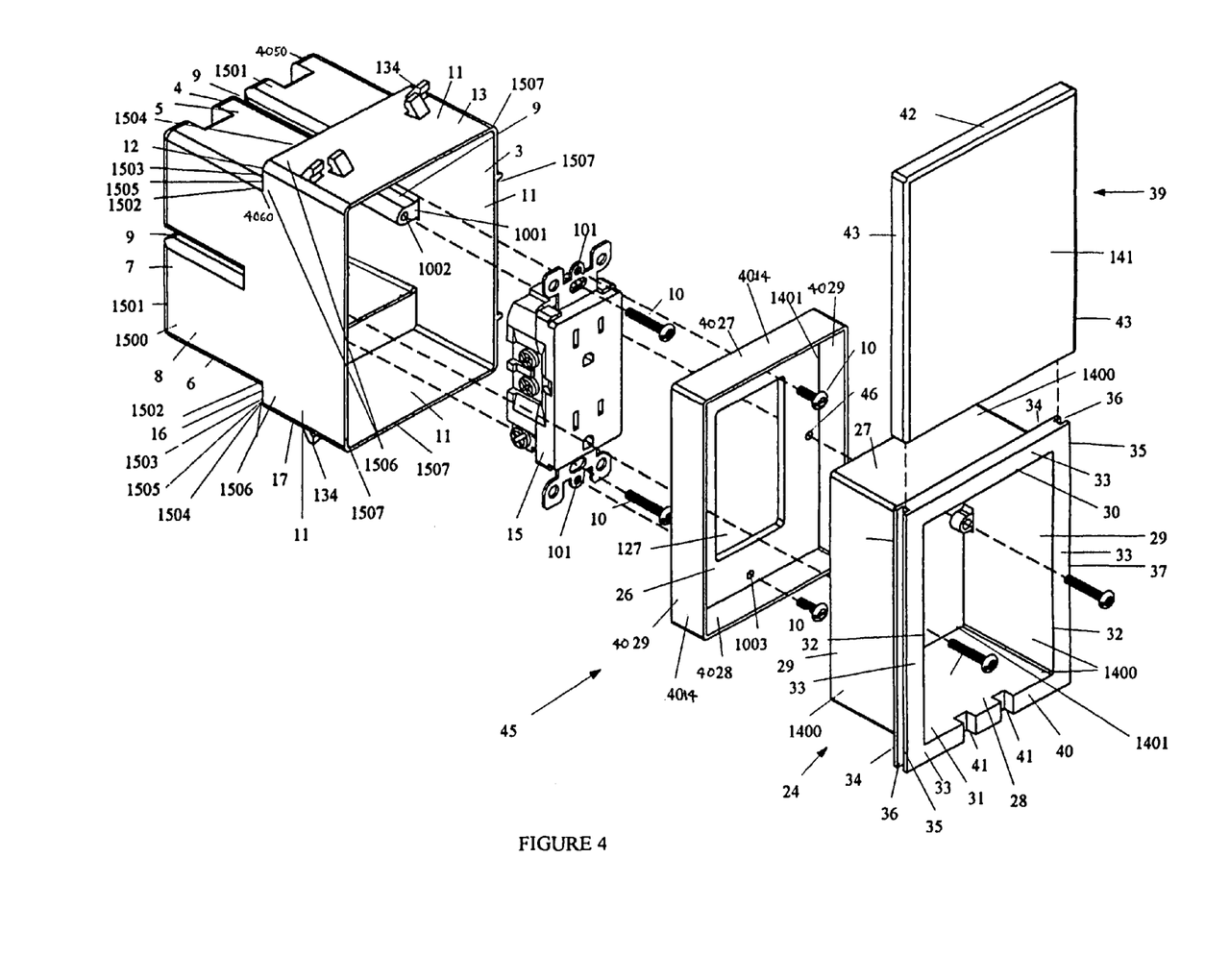
FIG. 4 is the same embodiment as that of FIG. 3 with the addition of a sliding cover.

As depicted in FIG. 4, the outer portion 45 of the two-piece recessed faceplate 25 optionally is designed, just as is the one-piece recessed faceplate 2, to have a cover 39.

Figure 5:
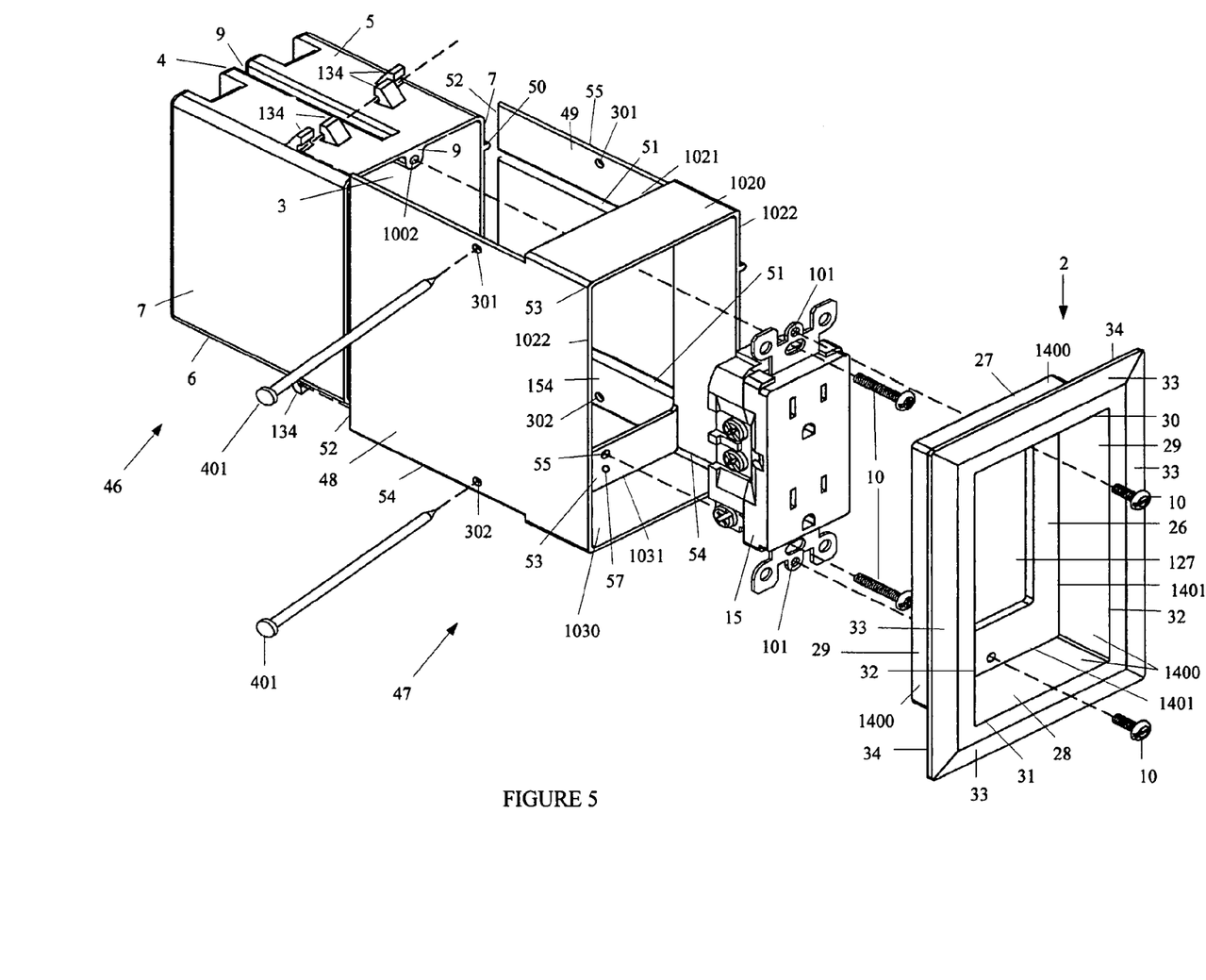
FIG. 5 shows an Electrical Box with Recessed Faceplate that is created by modifying a traditional electrical box.

The one-piece recessed faceplate 2 is also utilized with the embodiment of FIG. 5, which employs a traditional electrical box 46.

An extender 47 is placed around the traditional electrical box 46 to create an electrical box that is designed to have the electrical instrumentality 15 located in essentially the same position as with the unmodified traditional electrical box 46 but having the electrical box extend beyond that position.

The extender 47 has a first side 48 and a second side 49 constructed to slide along the outside surface of the sides 7 of the traditional electrical box 46, preferably leaving no substantial gaps between the sides 7 of the traditional electrical box 46 and the sides 48, 49 of the extender 47. Because the traditional electrical box 46 has two projections 50 on the side 7 along which the second side 49 of the extender 47 slides, the second side 49 of the extender 47 contains two channels 51 to accommodate the projections 50.

At a distance, from the back 52 of the sides 48, 49 of the extender 47, greater than the distance between the open front 3 of the traditional electrical box 46 and the projections 134 to hold nails 401, and preferably a distance substantially equal to the distance between the open front 3 and the closed back 4 of the traditional electrical box 46, a wall 53 is attached to the sides 48, 49 and runs from the bottom 54 to the top 55 of the sides 48, 49 of the extender 47 and from the first side 48 to the second side 49 of the extender 47. The sides 48, 49 and the wall 53 of the extender proceed both above and below the traditional electrical box 46. Each side 48, 49 contains an aperture 301 that will be above a height equal to the top 5 and an aperture 302 that will be below the level of the bottom 6 of a traditional electrical box 46, with such apertures 301, 302 also being at a position that will be in general alignment with the projections 134 when the extender 47 is placed on a traditional electrical box 46. The apertures 301, 302 then accommodate the nails 401 that go through the projections 134.

Contained within the wall 53 are one or more instrumentality apertures 154 to accommodate the electrical instrumentality 15. The one or more instrumentality apertures 154 can extend as far as desired toward the sides 48, 49, even reaching the sides 48, 49.

The wall 53 also has a lower aperture 55 and an upper aperture 56, placed so as to be generally aligned with the lower channel 9 and upper channel 9 of a traditional electrical box 46 when the extender 47 has been placed on a traditional electrical box 46, for screws 10 that will extend into the upper and lower channels 9 of the traditional electrical box 46 to fasten an electrical instrumentality 15 or a faceplate to the traditional electrical box 46. Optionally, below the lower aperture 55 is an aperture 57 to accommodate a screw 10 that extends through the wall 53 below the bottom 6 of the traditional electrical box 46. Similarly and optionally, above the upper aperture 56 is an aperture 59. Apertures 57, 59 accommodate screws 10 which are used to attach faceplates to the type of electrical instrumentality 15 depicted in FIG. 5, using threaded aperture 101 of the electrical instrumentality 15. The number and location of apertures for attaching a faceplate to an electrical instrumentality depend upon the particular electrical instrumentality 15 that is utilized.

Whether the attachment using apertures 55, 56 is for an electrical instrumentality 15 or the wall 53 is determined by whether the electrical instrumentality 15 is intended to be attached to the wall 53 or directly to the traditional electrical box 46. This is the same situation as for the new electrical box. If the electrical instrumentality 15 is intended to be attached directly to the traditional electrical box 46, the threaded apertures 1002 of the upper and lower channels 9 each accommodate a screw 10 for holding the electrical instrumentality 15 to the traditional electrical box 46, as illustrated in FIG. 5. Otherwise, the threaded apertures 1002 of the upper and lower channels 9 would be available to retain a screw 10 for holding the wall 53 to the traditional electrical box 46.

Furthermore, as is the case with traditional faceplates, attachment of an electrical instrumentality 15 to the wall 53 can be permanent or releasable.

An upper segment 1020 runs along and is attached to the top 1021 of the wall 53 between the sides 48, 49 of the extender 47 from the wall 53 to the front 1022 of the sides 48, 49 and is also attached to the top 55 of the sides 48, 49. Similarly, a lower segment 1030 runs along and is attached to the bottom 1031 of the wall 53 between the sides 48, 49 of the extender 47 from the wall 53 to the front 1022 of the sides 48, 49 and is also attached to the bottom 54 of the sides 48, 49.

Figure 6:
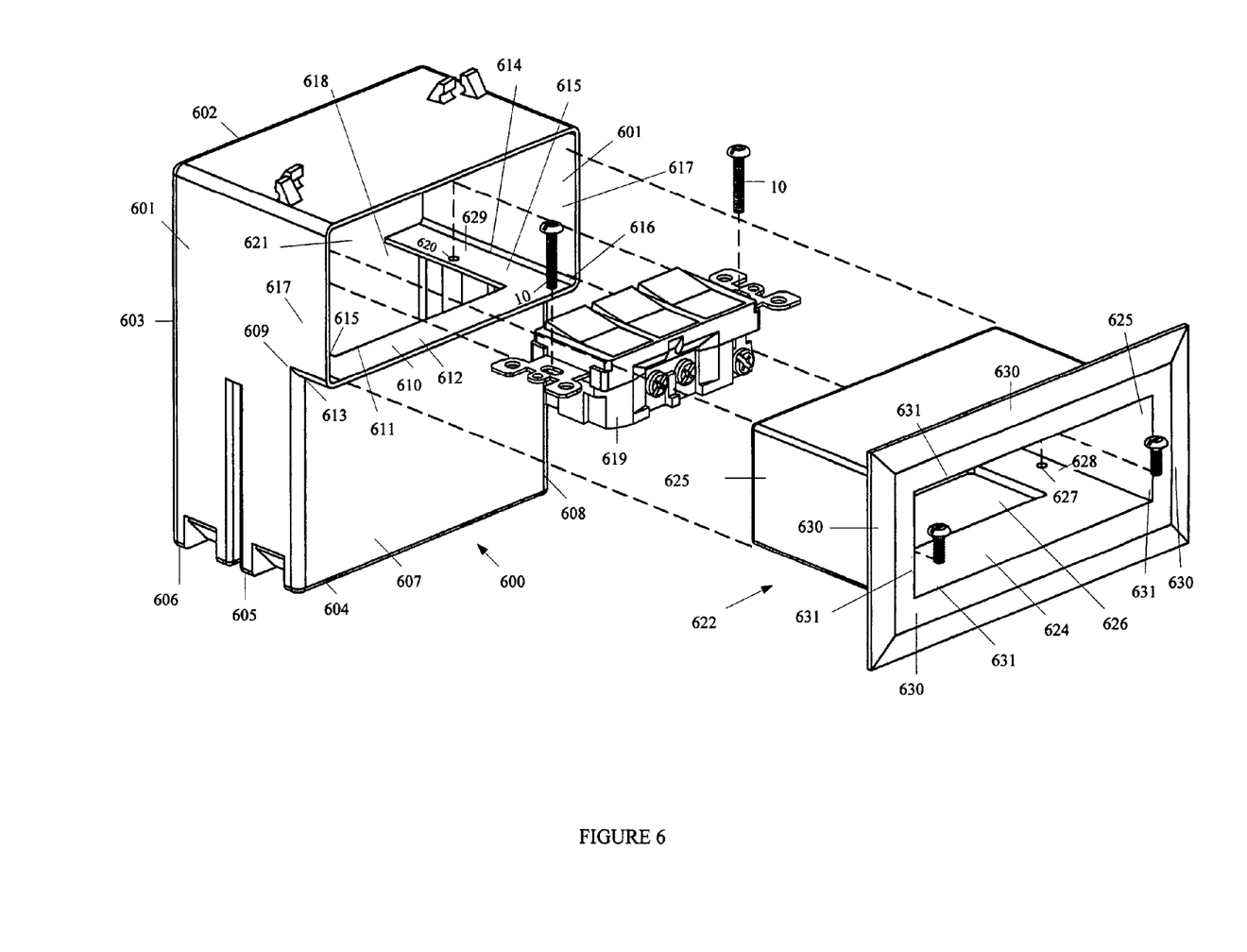
FIG. 6 portrays an Electrical Box with Recessed Faceplate for switches wherein the switches are to be oriented so that upon installation the faces of the switches will be other than parallel to the wall of building in which the electrical box is placed.
Figure 7:
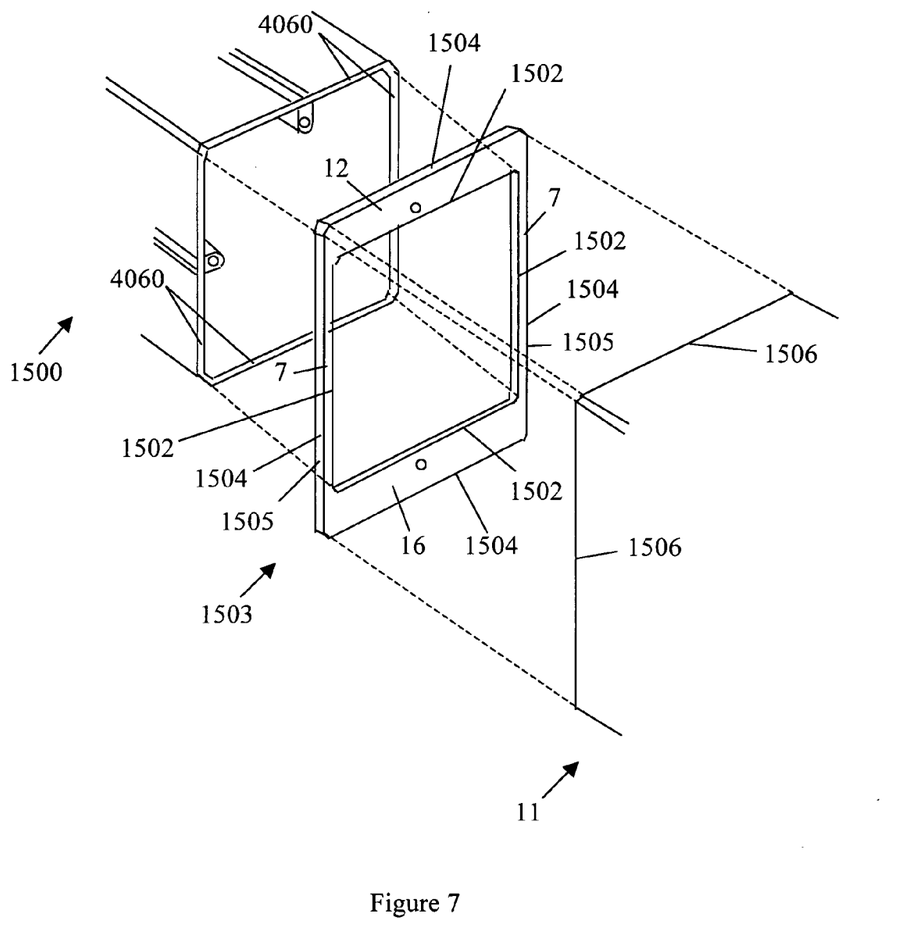
FIG. 7 is an exploded view of the Electrical Box with Recessed Faceplate.

Finally, a particular version of an Electrical Box with Recessed Faceplate is a switch box 600 which has two generally L-shaped sides 601, a back panel 602 running the length of and attached to a first end 603 of each L-shaped side 601, a bottom panel 604 attached to and running between the bottom 605 of the L-shaped sides 601 and also running along and attached to the bottom 606 of the back panel 602, a front panel 607 attached to a second end 608 of each L-shaped side 601 running between the L-shaped sides from the bottom 605 of the L-shaped sides to the vertex 609 of the L and also attached to the bottom panel 604, and a U-shaped ledge 610 having the inside 611 of the bottom 612 of the U-shaped ledge 610 attached to the top 613 of the front panel 607 and the outside 614 of the legs 615 of the U-shaped ledge 610 attached to the generally L-shaped sides 601 in substantial alignment with the inside edge 616 of the shorter leg 617 of the L.

Thus, an aperture 618 exists in the U-shaped ledge 610 to accommodate a switch 619. A threaded aperture 620 in each leg 615 of the U-shaped ledge 610 accommodates a screw 10 to hold the switch 619 in place.

A primary aperture 621, consequently, also exists above the front panel 607. An insert 622 having a top 623, bottom 624, and two sides 625 has an aperture 626 in the bottom to accommodate the switch 619. The insert 622 slidably mounts within the primary aperture 621, i.e., above the U-shaped ledge 610. An aperture 627 in one or more ends 628 of the bottom 624 of the insert 622 is designed to be substantially aligned with one or more secondary threaded apertures 629 in the legs 615 of the U-shaped ledge 610 after the insert 622 has been placed into the primary aperture 621 in order to accommodate a screw 10 to hold the insert 622 in place.

Finally, a flange 630 extends from the outer edges 631 of the insert 622 generally perpendicular to the top 623, bottom 624, and two sides 625 of the insert 622. The flange 630 is designed to seat substantially against the mounting surface.

Whenever in the preceding discussion a threaded aperture has been mentioned, a non-threaded aperture could, instead, be used together with a threaded nut; and the term "threaded aperture" is intended to encompass such structure.

I claim:

1. An Electrical Box with Recessed Faceplate, which comprises:
   a faceplate comprising:
      an outer portion comprising:
         a flange;

an interior surface having sides, being attached to the flange, and projecting generally rearward from the flange; and a longitudinal projection extending inward from each side of the interior surface and having a means for accommodating a releasable fastener; and an inner portion comprising:

a rear wall with a perimeter and a cross-sectional shape, the rear wall containing one or more instrumentality apertures and having a means for accommodating a releasable fastener for attaching said faceplate to an electrical instrumentality as well as a means for accommodating a second releasable fastener; and an interior surface projecting generally forward from the rear wall and connected to the rear wall, with the dimensions of the interior surface of the inner portion being such that the interior surface of the inner portion will fit into and slide along the interior surface of the outer portion with substantially no gaps between such interior surfaces; and a box comprising:

a rear wall having a perimeter;

a lateral surface, having a first end attached to and projecting generally forward from the perimeter of the rear wall and having a top containing a channel, a bottom containing a channel, and sides each containing a channel, with each channel having an interior end;

a connecting wall having a first end attached to a second end of the lateral surface, the connecting wall having sides and a second end and said connecting wall extending generally outward from the lateral surface; and a front portion having a first end attached to and projecting generally forward from the sides and the second end of the connecting wall, the front portion containing the interior ends of the channels, the front portion having a second end forming an open mouth, the front portion having substantially the same cross-sectional shape as does the rear wall of said faceplate, and the front portion having dimensions such that the flange of the faceplate extends from the interior surface to a position laterally beyond the front of the mouth;

a means for accommodating a releasable fastener for attaching said box to an electrical instrumentality; and a means for accommodating a releasable fastener for drawing toward said box and releasably retaining the outer portion of said faceplate.

2. The Electrical Box with Recessed Faceplate as recited in claim 1, wherein:

the means for accommodating a releasable fastener in the longitudinal projection is an aperture when the releasable fastener accommodated thereby is a screw;

the means for accommodating a releasable fastener for attaching said faceplate to an electrical instrumentality which means comprises part of the faceplate is one or more apertures in the faceplate as well as one or more apertures in the connecting wall when the fastener for attaching said faceplate to an electrical instrumentality is a screw;

the means for accommodating a releasable fastener for attaching said box to an electrical instrumentality is a covered interior end having a threaded aperture for the channel on the top of the lateral surface of the box and a covered interior end having a threaded aperture for the channel on the bottom of the lateral surface of the box;

the means for accommodating a releasable fastener for drawing toward said box and releasably retaining the outer portion of said faceplate is a covered interior end having a threaded aperture for the channels on the sides of the lateral surface of the box so that said threaded aperture can receive screws which pass through the apertures in the longitudinal projections; and the means for accommodating a second releasable fastener in the rear wall of the faceplate is an aperture.

3. The Electrical Box with Recessed Faceplate as recited in claim 2, wherein:

said faceplate and said box each have a rectangular cross section.

4. The Electrical Box with Recessed Faceplate as recited in claim 1, wherein:

said faceplate and said box each have a rectangular cross section.

5. An Electrical Box with Recessed Faceplate, which comprises:

a faceplate comprising:

an outer portion comprising:

a flange;

an interior surface having sides, being attached to the flange, and projecting generally rearward from the flange; and a longitudinal projection extending inward from each side of the interior surface and having a means for accommodating a releasable fastener; and an inner portion comprising:

a rear wall with a perimeter and a cross-sectional shape, the rear wall containing one or more instrumentality apertures and having a means for accommodating a fastener for attaching said faceplate to an electrical instrumentality as well as a means for accommodating a releasable fastener; and an interior surface projecting generally forward from the rear wall and connected to the rear wall, with the dimensions of the interior surface of the inner portion being such that the interior surface of the inner portion will fit into and slide along the interior surface of the outer portion with substantially no gaps between such interior surfaces; and a box comprising:

a rear wall having a perimeter;

a lateral surface, having a first end attached to and projecting generally forward from the perimeter of the rear wall and having a top containing a channel, a bottom containing a channel, and sides each containing a channel, with each channel having an interior end;

a connecting wall having a first end attached to a second end of the lateral surface, the connecting wall having sides and a second end and said connecting wall extending generally outward from the lateral surface; and a front portion having a first end attached to and projecting generally forward from the sides and the second end of the connecting wall, the front portion containing the interior ends of the channels, the front portion having a second end forming an open mouth, the front portion having substantially the same cross-sectional shape as does the rear wall of said faceplate, and the front portion having dimensions such that the flange of the faceplate extends from the interior surface to a position laterally beyond the front of the mouth;

a means for accommodating a releasable fastener for attaching said box to said faceplate; and a means for accommodating a releasable fastener for drawing toward said box and releasably retaining the outer portion of said faceplate.

6. The Electrical Box with Recessed Faceplate as recited in claim 5, wherein:

the means for accommodating a releasable fastener in the longitudinal projection is an aperture when the releasable fastener accommodated thereby is a screw;

the means for accommodating a releasable fastener in the rear wall of the faceplate is one or more apertures in the rear wall of the faceplate when the releasable fastener is a screw; and the means for accommodating a releasable fastener for attaching said box to said faceplate is a covered interior end having a threaded aperture for the channel on the top of the lateral surface of the box and a covered interior end having a threaded aperture for the channel on the bottom of the lateral surface of the box when the releasable fastener is a screw that will pass through the aperture in the rear wall of the faceplate; and the means for accommodating a releasable fastener for drawing toward said box and releasably retaining the outer portion of said faceplate is a covered interior end having a threaded aperture for the channels on the sides of the lateral surface of the box so that said threaded aperture can receive screws which pass through the apertures in the longitudinal projections.

7. The Electrical Box with Recessed Faceplate as recited in claim 6, wherein:

said faceplate and said box each have a rectangular cross section.

8. The Electrical Box with Recessed Faceplate as recited in claim 5, wherein:

said faceplate and said box each have a rectangular cross section.

* * * * *